United States Patent
Abernethy, Jr. et al.

(10) Patent No.: US 7,991,128 B2
(45) Date of Patent: Aug. 2, 2011

(54) MIRRORING OF CONVERSATION STUBS

(75) Inventors: Michael Negley Abernethy, Jr., Pflugerville, TX (US); Gabriel Aaron Cohen, Durham, NC (US); Travis M. Grigsby, Austin, TX (US); Renee Marie St. Amant, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1309 days.

(21) Appl. No.: 11/555,440

(22) Filed: Nov. 1, 2006

(65) Prior Publication Data

US 2008/0104612 A1 May 1, 2008

(51) Int. Cl.
*H04M 1/64* (2006.01)

(52) U.S. Cl. ............... 379/88.24; 370/352; 379/88.04; 379/88.07; 379/88.08; 379/88.11; 379/93.03; 379/93.04; 379/93.28; 379/201.01; 455/412.1; 455/414.1; 707/231; 707/246; 707/251; 707/270; 709/201; 709/224

(58) Field of Classification Search .......... 370/351–356; 379/67.1–88.28, 93.01–93.04, 93.26–93.34, 379/201.01; 455/412.1–414.2; 704/1–10, 704/231–233, 246, 251, 270–278; 340/3.1–3.32, 340/5.8–5.86
See application file for complete search history.

(56) References Cited

U.S. PATENT DOCUMENTS

| | | | |
|---|---|---|---|
| 5,559,875 A * | 9/1996 | Bieselin et al. | 379/202.01 |
| 5,943,402 A * | 8/1999 | Hamel et al. | 379/88.26 |
| 6,222,909 B1 * | 4/2001 | Qua et al. | 379/88.22 |
| 6,298,129 B1 * | 10/2001 | Culver et al. | 379/202.01 |
| 6,792,093 B2 * | 9/2004 | Barak et al. | 379/202.01 |
| 2002/0110226 A1 * | 8/2002 | Kovales et al. | 379/88.17 |
| 2004/0132432 A1 * | 7/2004 | Moores et al. | 455/413 |
| 2004/0203621 A1 * | 10/2004 | Brown et al. | 455/412.1 |
| 2005/0108239 A1 | 5/2005 | Evans et al. | |
| 2005/0176410 A1 | 8/2005 | Brooking et al. | |
| 2006/0036692 A1 | 2/2006 | Morinigo et al. | |
| 2006/0045243 A1 | 3/2006 | Durga et al. | |
| 2006/0056599 A1 * | 3/2006 | Cragun | 379/67.1 |
| 2007/0133437 A1 * | 6/2007 | Wengrovitz et al. | 370/260 |
| 2007/0133524 A1 * | 6/2007 | Kwon | 370/356 |
| 2008/0095348 A1 * | 4/2008 | Abernethy et al. | 379/202.01 |

FOREIGN PATENT DOCUMENTS

| | | |
|---|---|---|
| EP | 0715442 A2 | 6/1996 |
| JP | 2005011333 A | 1/2005 |
| WO | 03053083 A2 | 6/2003 |

* cited by examiner

*Primary Examiner* — Hemant Patel
(74) *Attorney, Agent, or Firm* — Yee & Associates, P.C.; David A. Mims, Jr.

(57) ABSTRACT

A computer implemented method and computer program product for managing conversational input. The process authenticates a user on a device in a set of communication devices for manipulating conversation stubs. The process monitors an exchange of conversation for a triggering event on the device in a set of communication devices. Responsive to detecting the triggering event, the process generates a conversation stub that contains information relating to the topic of conversation. The conversation stub is stored in a storage device located remotely to the set of communication devices. Responsive to receiving a selection of the conversation stub, the process presents the conversation stub on a communication device selected from the set of communication devices.

18 Claims, 3 Drawing Sheets

MIRRORING OF CONVERSATION STUBS

BACKGROUND OF THE INVENTION

1. Field of the Invention

The present invention relates generally to an improved data processing system and in particular to managing conversational input. More particularly, the present invention is directed to a computer implemented method and computer program product for creating conversation stubs relating to topics of conversation to monitor communication between users.

2. Description of the Related Art

Many instances are present in which a user communicating by means of one or more communication devices purposefully or inadvertently fails to fully discuss an issue, complete a train of thought, or fully explore a given topic of conversation. As used herein, communication devices include, but are not limited to hardwired telephones, cellular (cell) phones, voice-over-Internet phones, satellite phones, personal digital assistants (PDAs), desktop computers, laptop computers, tablet personal computers (PCs), instant messenger devices, or any other known or available device that permits the exchange of verbal or written conversational input. Conversational input relates to the subject of a verbal and/or written communication between users of communication devices and can include, but is not limited to, spoken or recorded conversation, email or text messages, or a sequence of key strokes inputted on a communication device.

A conversation may be interrupted when one party to a phone call interrupts the other party with a second topic of conversation. When the second topic of conversation is completed, the parties may desire to return to the original topic of conversation. By this time, however, neither party may be able to recall that topic of conversation, or the context in which the conversation occurred. Likewise, parties to a cell phone conversation may be unable to complete a conversation because the battery on one phone runs out, the call is dropped by the cellular carrier, or one party moves out of range of the cellular tower. Finally, another scenario may occur where one party to a conversation purposefully and prematurely terminates the conversation because a more pressing matter arises.

In yet another example scenario, parties to an instant messenger conversation, such as Microsoft® MSN Messenger program or America Online AOL® Instant Messenger (IM) program, initiate a conversation that is prematurely terminated because the power goes out, or a computer crashes. If, by the time the conversation resumes, neither party to the original instant message conversation has access to their instant message account, the possibility exists that that neither party will be able to recall where the conversation terminated, or if there were unresolved issues to discuss.

In each of these scenarios, by the time the parties can find an alternate means of communication, or the parties are ready and willing to resume an original conversation, the conversation may already have become unsalvageable. For example, the possibility exists that neither party may be able to recall the relevant details of that conversation, whether unresolved issues remained, and if all relevant information had been conveyed to the other party during the course of the interrupted conversation. Furthermore, the purpose of the conversation may have already been rendered moot by the passage of time.

One remedy to the problem presented above is to create an agenda or checklist relating to the topics of conversation. Items on the agenda can be crossed off as topics are discussed. However, there is no guarantee that the conversation will not stray from that agenda as the conversation progresses. Furthermore, this process is time consuming and impractical for most conversations where the topics of conversation develop spontaneously.

Alternatively, users can record a phone conversation for later reference. However, a user must replay the entire audio recording of the conversation until the specific issue is located. This process of retrieving discrete portions of a recorded conversation is time consuming and inefficient. This method can be particularly burdensome for a user attempting to locate a specific segment of a lengthy conversation and/or where the user is attempting to track a given topic of conversation that may have been discussed sporadically throughout the entire course of a given conversation.

A user can also handwrite notes during a conversation relating to any topic that parties to the conversation failed to discuss in its entirety. However, a user may miss other important information discussed during the conversation while attempting to transcribe a previous portion of the conversation. Furthermore, this approach may be impractical given that people often multitask while on the phone. Consider, for example, the difficulty in trying to take notes while speaking on the phone and driving a car.

As is evident from the foregoing discussion, the currently available techniques for tracking and resuming interrupted conversations can be burdensome, inefficient, and sometimes unpractical.

SUMMARY OF THE INVENTION

The illustrative embodiments described herein provide a computer implemented method and computer program product for managing conversational input. The process authenticates a user on a device in a set of communication devices for manipulating conversation stubs. The process monitors a stream of conversation for a triggering event on the first communication device in the set of communication devices. Responsive to detecting the triggering event, the process generates a conversation stub that contains information relating to the topic of conversation. The conversation stub is stored in a storage device located remotely to the set of communication devices. Responsive to receiving a selection of the conversation stub, the process presents the conversation stub on a communication device selected from the set of communication devices.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
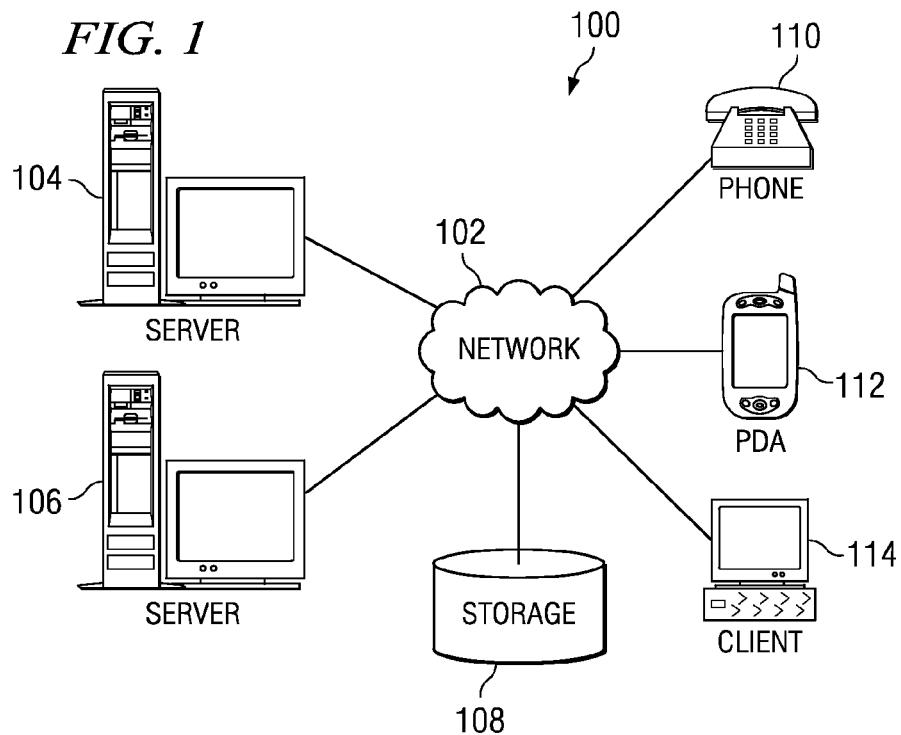
FIG. 1 is a pictorial representation of a network of data processing systems in which illustrative embodiments may be implemented.
Figure 2:
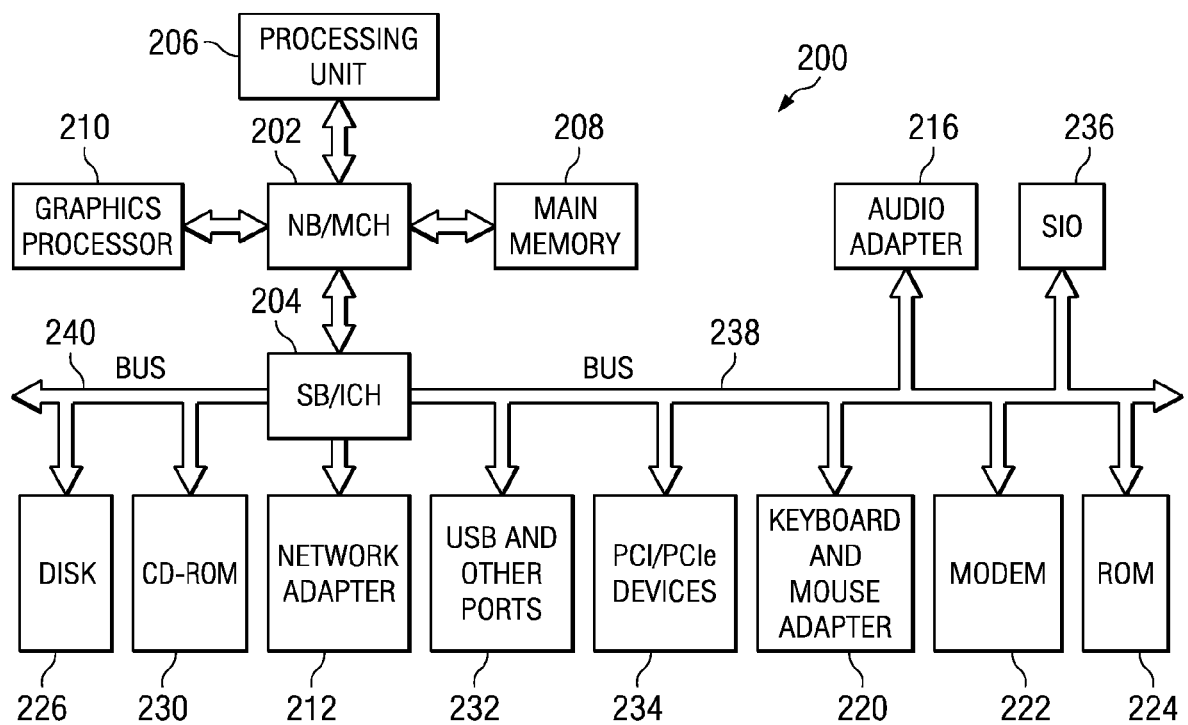
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computing devices in which embodiments may be implemented. Network data processing system 100 contains network 102, which is the medium used to provide communications links between various devices and computers connected together within network data processing system 100. Network 102 may include connections, such as wire, wireless communication links, or fiber optic cables. The depicted example in FIG. 1 is not meant to imply architectural limitations. For example, data processing system 100 also may be a network of telephone subscribers and users.

In the depicted example, server 104 and server 106 connect to network 102 along with storage unit 108. In addition, phone 110, PDA 112, and client 114 are coupled to network 102. Phone 110, PDA 112, and client 114 are examples of communication devices used to transmit conversational input throughout network data processing system 100. Conversational input is a form of data exchangeable in network data processing system 100. For example, conversational input includes, but is not limited to, verbal communication, such as spoken words, written communications, such as emails or instant messages, audio recordings, such as recorded conversation, key strokes, or other types of communicable information. The illustrative embodiments of the present invention can be implemented to manage conversational input transmitted by network data processing system 100.

Phone 110 may be, for example, an ordinary wired telephone, a wireless telephone, a cellular (cell) phone, satellite phone, or voice-over-Internet phone. Personal digital assistant (PDA) 112 may be any form of personal digital assistant, such as Palm OS® Windows Mobile® Pocket PC®, Blackberry®, or other similar handheld computing device. Client 114 may be, for example, a personal computer, laptop, tablet PC, or network computer. In the depicted example, server 104 provides data, such as boot files, operating system images, and applications to phone 110, PDA 112, and client 114. Phone 110, PDA 112, and client 114 are coupled to server 104 in this example. Network data processing system 100 may include additional servers, phones, PDAs, clients, and other communication or computing devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), a wide area network (WAN), a telephone network, or a satellite network. FIG. 1 is intended as an example, and not as an architectural limitation for different embodiments.

With reference now to FIG. 2, a block diagram of a data processing system is shown in which illustrative embodiments may be implemented. Data processing system 200 is an example of a computing device, such as server 104 or phone 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments described herein provide a computer implemented method and computer program product for managing conversational input. The process authenticates a user on a communication device in a set of communication devices for manipulating conversation stubs. A set of communication devices is two or more communication devices on which a user can be authenticated and which are capable of generating and presenting conversation stubs. The set of communication devices may include two or more communication devices identified above, such as hardwired telephones, cellular (cell) phones, voice-over-Internet phones, satellite phones, PDAs, desktop computers, laptop computers, tablet PCs, instant messenger devices, or any other known or available device that permits the exchange of verbal or written conversational input.

A conversation stub is a data structure used to store information that serves as a reminder of a particular conversation by presenting to a user of a communication device information relating to the topic of conversation. One or more conversation stubs can be generated for each conversation. The information relating to the topic of conversation can include any user-defined/predefined/default topic, subject matter, keyword, name, or any other descriptor or identifier, such as a word, a combination of words, icons, numbers, letters, symbols, dates and times, or any combination thereof relating to conversational input. In addition, the conversation stub can comprise a sequence of key strokes such as a text message or phone number.

Authentication of a user on a communication device ensures that the conversation stubs will be generated for and presented only to the user of a communication device. In this manner, the actual owner of the communication device, if different than the user of the communication device, will not have access to the user's conversation stubs. User authentication can occur by means of voice recognition, a username and password combination, biometric identification, or any other currently available or later developed forms of authentication.

In the illustrative embodiments, a process monitors a conversation for a triggering event on a communication device in a set of communication devices on which a user is authenticated. A triggering event is an event that triggers creation of a conversation stub at a given point in the conversation at which the triggering event occurred. The triggering event may be predefined using a policy having instructions for a process for identifying certain events, the occurrence of which results in corresponding actions, such as generating a conversation stub that includes a snippet of a recorded conversation, or a keyword associated with the conversation. A triggering event can include, but is not limited to the detection of overlapping voices, a disconnected call, a fading cell phone signal, a voice inflection, a level of background noise, a predefined word or phrase, or selection of a control to generate a conversation stub. Upon detecting the triggering event, the process generates a conversation stub containing information relating to the topic of conversation occurring at the time the triggering event was detected.

In these illustrative examples, the conversation stub is stored in a storage device located remotely to the set of communication devices. Responsive to receiving a selection of the conversation stub, the process presents the conversation stub on a communication device selected from the set of communication devices on which the user is authenticated. The conversation stubs are stored in text or audio format, and can include any combination of numbers, letters, symbols, pictures, icons, or sound recordings.

In one embodiment, an owner or provider of a communication service, communication capability and/or communication device may charge a fee for access to a conversation stub feature. For example, where the communication device is a cellular telephone, a cellular service provider can charge a user to access and utilize conversation stubs prior to, during, or after a cellular telephone conversation. In accordance with an illustrative embodiment, an owner, operator, manager, or provider of a communication service, communication capability and/or a communication device may charge a fee based on any known or available methods for charging fees, including a flat fee, a fee based on an amount of time a user uses the conversation stub feature, a number of times a user uses a conversation stub feature, a subscription fee based on a daily, weekly, monthly, or yearly subscription to a conversation stub feature, or any other system or method for charging a fee.

Figure 3:
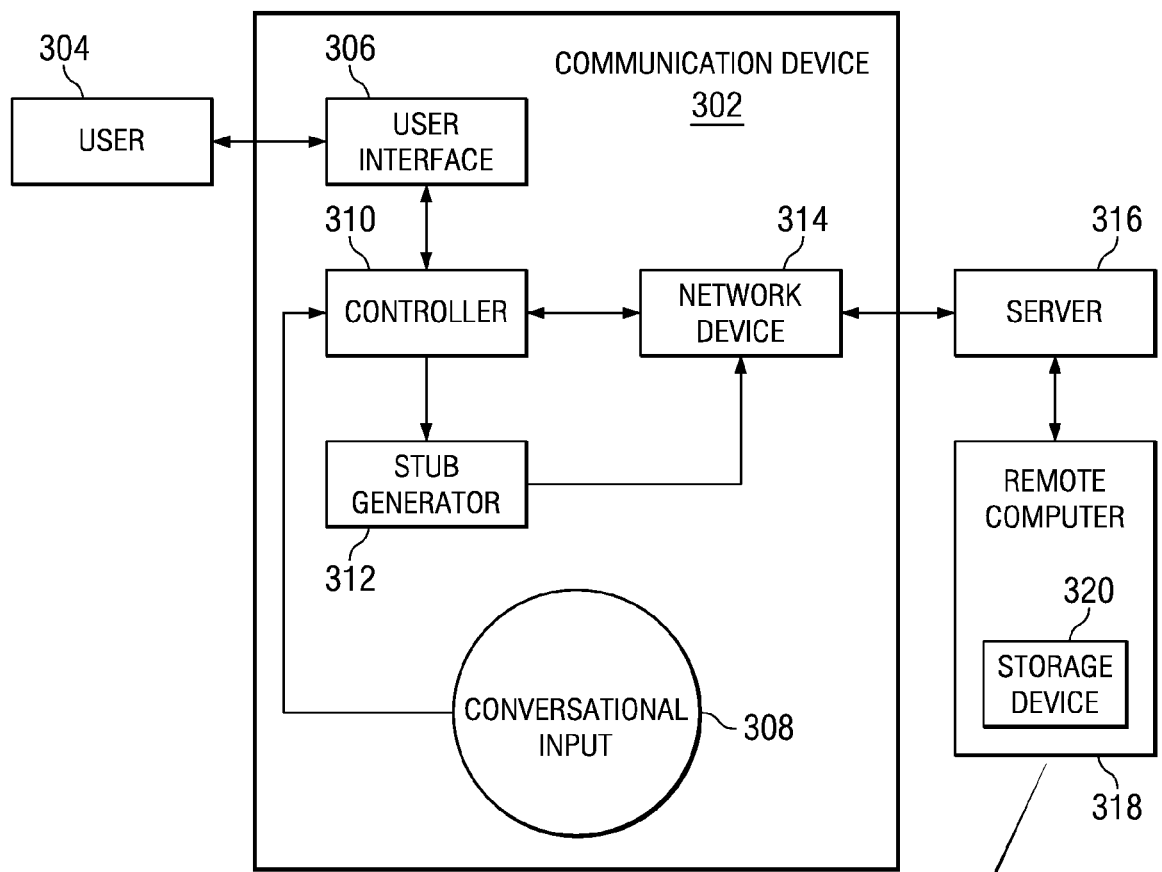
FIG. 3 is a block diagram illustrating a data flow through components of a system for managing conversational input in accordance with an illustrative embodiment.
Figure 3:
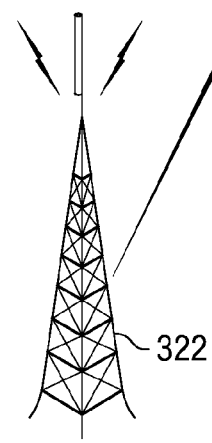

Turning now to FIG. 3, a block diagram illustrating the data flow through components of a process for managing audio information is depicted in accordance with an illustrative embodiment. The components of FIG. 3 are components of a system for managing audio information, such as the network data processing system 100 of FIG. 1.

Communication device 302 is a device for enabling the exchange of conversational input between a user of communication device 302 and one or more other users of one or more other communication devices. Communication device 302 includes, but is not limited to a telephone, a PDA, a computer, or any other known or available device for receiving and/or sending conversational input. In this illustrative example, communication device 302 is a cellular telephone.

User 304 utilizes user interface 306 to operate communication device 302 in order to communicate with users of other communication devices, and to generate conversation stubs relating to conversational input 308. User interface 306 is any known or available type of user interface, including but not limited to, a touch screen, a graphical user interface (GUI), a keyboard, a mouse, an alphanumeric keypad, a voice recognition system, or any other type of user interface.

To ensure that the conversation stubs are only accessed by the intended user, communication device 302 requires the authentication of user 304 before conversation stubs can be generated or presented. The authentication of user 304 can be accomplished by any number of currently known or later developed methods of establishing the identity of user 304. For example, user 304 can input a user name and password on user interface 306 in order to use communication device 302.

In this embodiment, controller 310 authenticates user 304 to utilize communication device 302. For example, controller 310 may authenticate user 304 to utilize communication device 302 by a voice recognition means. A sample voice recording of user 304 may be stored on communication device 302 to compare with that of user 304. If controller 310 matches user 304 with the recorded voice sample, then user 304 is authenticated to use communication device 302. In another embodiment, the voice sample may be stored in a remote storage device that is communicatively coupled to communication device 302.

In yet another embodiment, user 304 may also be authenticated to use communication device 302 by means of a portable transaction device (PTD). The PTD is capable of storing data that would authenticate user 304 to utilize communication device 302. Thus, controller 310 could authenticate user 304 by communicating with the PTD and exchanging the authenticating data.

Controller 310 receives conversational input 308, and monitors conversational input 308 for a triggering event. Controller 310 may also monitor the ambient, background noise of conversational input 308 for a possible triggering event. A triggering event results in stub generator 312 generating a conversation stub relating to a portion of conversational input 308. A triggering event is a predefined event recognized by controller 310 that results in stub generator 312 generating a conversation stub at a given point in the conversation. A triggering event may comprise, for example, the overlapping voices of users over two or more communication devices; a disconnected, dropped, or interrupted call; a voice inflection, or lack thereof; a level of background noise that exceeds a predetermined threshold; a predefined word or phrase uttered by a party to the conversation; or a user-initiated triggering event, such as a voice command or the selection to generate a conversation stub from user interface 306. Thus, for example, if controller 310 detects multiple simultaneous voices, stub generator 312 generates a conversation stub relating to the portion of conversational input 308 where the two voices overlap. In addition, stub generator 312 can generate one or more conversation stubs for each overlapping voice.

Controller 310 may also detect that a second speaker has begun speaking before the first speaker has concluded. For example, a voice inflection typically signals that a party to a conversation has finished communicating a thought. Accordingly, controller 310 may monitor conversational input 308 and generate a conversation stub if a second speaker begins speaking before the first speaker's voice inflection signals that he or she has finished speaking. Further still, a raised tone of voice typically signals that a second speaker intends to interrupt the first speaker, or that the party intends to introduce an important topic of conversation. Thus, controller 310 may also monitor conversational input 308 and generate a conversation stub as a party to a conversation raises his or her voice during the conversation in order to interrupt the other party. For example, if a user 302 is talking about topic X, and the other party interrupts by introducing topic Y, then stub generator 312 may generate a conversation stub relating to topic X and topic Y.

In addition, a triggering event could be a word or phrase uttered by one of the participants to the conversation. For example, a wife calls her husband to remind him to pick up a bottle of wine on his way home from work. She may state, "Don't forget to pick up a bottle of wine for dinner." In this example, controller 310 may recognize the triggering event, which is the phrase "Don't forget," and in response, stub generator 312 generates a conversation stub relating to the conversation. For instance, the conversation stub in this illustrative example may include the following information relating to the topic of conversation: the triggering event "Don't forget," the terms "bottle of wine," and the keyword "dinner" in order to give the conversation stub context. In this example, the word "dinner" may be included in the conversation stub to give the conversation stub some context.

In addition, stub generator 312 may generate a conversation stub if controller 310 determines that the exchange of conversational input 308 has been interrupted. For example, referring back to the cell phone of the illustrative embodiment, if controller 310 detects that the call was dropped in the middle of the conversation, then stub generator 312 generates a conversation stub relating to the conversation immediately prior to the termination of the conversation. In this manner, user 304 can access the conversation stub relating to the conversation that was occurring at the point when the conversation prematurely terminated and resume the conversation upon finding an alternate communication device.

In accordance with the illustrative embodiments, a triggering event can also include a user-initiated triggering event, such as a voice command or a user selection to generate a conversation stub. A voice command can be a predefined word, phrase, or sentence uttered by user 304, such as "Computer, generate stub." The voice command is recognized by controller 310 and results in stub generator 312 generating a conversation stub.

In addition, a user-initiated trigger can be the selection to generate a conversation stub from the user interface 306 of communication device 302. For example, where communication device 302 is a cell phone, pressing a button labeled "#" during a conversation may cause stub generator 312 to generate a conversation stub. This may cause a conversation stub to be generated that relates to the last five seconds of conversation. In another embodiment, pressing the "#" button may cause stub generator 312 to generate a stub relating to the next five seconds of conversation. It should be noted that the pressing of any button or combination of buttons on a communication device, such as communication device 302, could serve to initiate the generation of a conversation stub relating to any predetermined portion or length of conversational input 308.

After generation of the conversation stub, the conversation stub is stored such that the stub could be referenced by user 304 during the course of utilizing communication device 302, but would be unavailable to any subsequent user once user 304 logs off. In one illustrative embodiment, the conversation stubs are not permanently stored on communication device 302, but rather are stored elsewhere on remote storage device 320 that is located remotely to communication device 302. A conversation stub may be retrieved from the remote storage device by controller 310 for example, and delivered to communication device 302, or any other communication device on which user 304 is authenticated, in response to a user selection of the communication stub.

In the illustrative embodiment in FIG. 3, the conversation stub is stored in storage device 320 that is located remotely to communication device 302. The conversation stub is then transmitted to other communication devices for presentation to user 304 via communication transmission tower 322. In another embodiment, transmission tower 322 may be replaced with other available or known connections for data transfer, such as wire, wireless communication links, fiber optic cables, or satellites.

In another embodiment, the conversation stub generated by stub generator 312 is stored on the PTD carried by user 304. The conversation stub is then replicated on another communication device through a transfer of data between the PTD and any subsequent communication device utilized by user 304. This data transfer can occur through any available or known connections for data transfer, such as wire, wireless communication links, fiber optic cables, or satellites.

The storage of the conversation stubs can be permanent or temporary. Permanent storage of the conversation stub permits user 304 to continually access and refer to the stored stubs. Stub generator 312 can continue to generate conversation stubs for storage in storage device 320, or alternate form of storage, as long as storage device 320 has capacity. When storage device 320 no longer has capacity to store additional stubs, newly generated conversation stubs may replace the oldest conversation stubs. Alternatively, in another embodiment, user 304 may be notified by controller 310 that storage device 320 lacks further capacity. Controller 310 may prompt user 304 to delete conversation stubs to free up additional memory. In this manner, users could reference, update, or delete the stubs as necessary.

In another embodiment, the conversation stubs exist only as long as user 304 is utilizing communication device 302. In this example, once user 304 discontinues use of communication device 302, controller 310 may delete all conversation stubs relating to that particular exchange of conversational input 308. Further, the temporary storage of conversation stubs may be an option selectable by user 304 from user interface 306 for security reasons. User 304 may desire to ensure that subsequent users of communication device 302 could not somehow access user 304's private or confidential communication stubs, or may wish to protect certain information from others that may have access to user 304's authentication information, such as user 304's user name and password.

Furthermore, the storage of the conversation stubs can be temporary, and automatically deleted upon termination of the session. Thus, for example, in a conversation occurring on a cell phone, the cell phone may generate a list of conversation stubs that is erased from remote storage device 320 when the call ends, or when the user logs off of the device.

The conversation stubs are presented by communication device 302 in a format easily referenced by user 304, such as in a list or menu. The conversation stubs may contain a date and time, or a keyword to permit a user to differentiate among the conversation stubs listed. Selecting any one of the abbreviated conversation stubs provides additional information relating to the conversation stub, such as the entire conversation stub, the triggering event, and a word or phrase to put the conversation stub into some context. Furthermore, the list may contain an icon, the selection of which plays an audio version of the conversation stub. In one example, the conversation stubs are displayed in an abbreviated format in the list. For example, instead of displaying the entire keyword "doctor" the list could display an abbreviated "Dr" instead. In this manner, an increased amount of information can be displayed to the user on a given display screen.

Communication device 302 may also contain network adapters or other devices, such as network device 314 to enable communication device 302 to interact with other communication devices, data processing systems, remote printers or storage devices through intervening private or public networks. Network device 314 may comprise, for example, a wireless modem, cable modem, Ethernet card, wireless network card, transceiver components of a mobile phone, or any other known or available means for transmitting and/or receiving data. In this embodiment, network device 314 is coupled to remote server 316. Remote server 316 is in turn coupled to remote computer 318 that is further coupled to data storage device 320.

Figure 4:
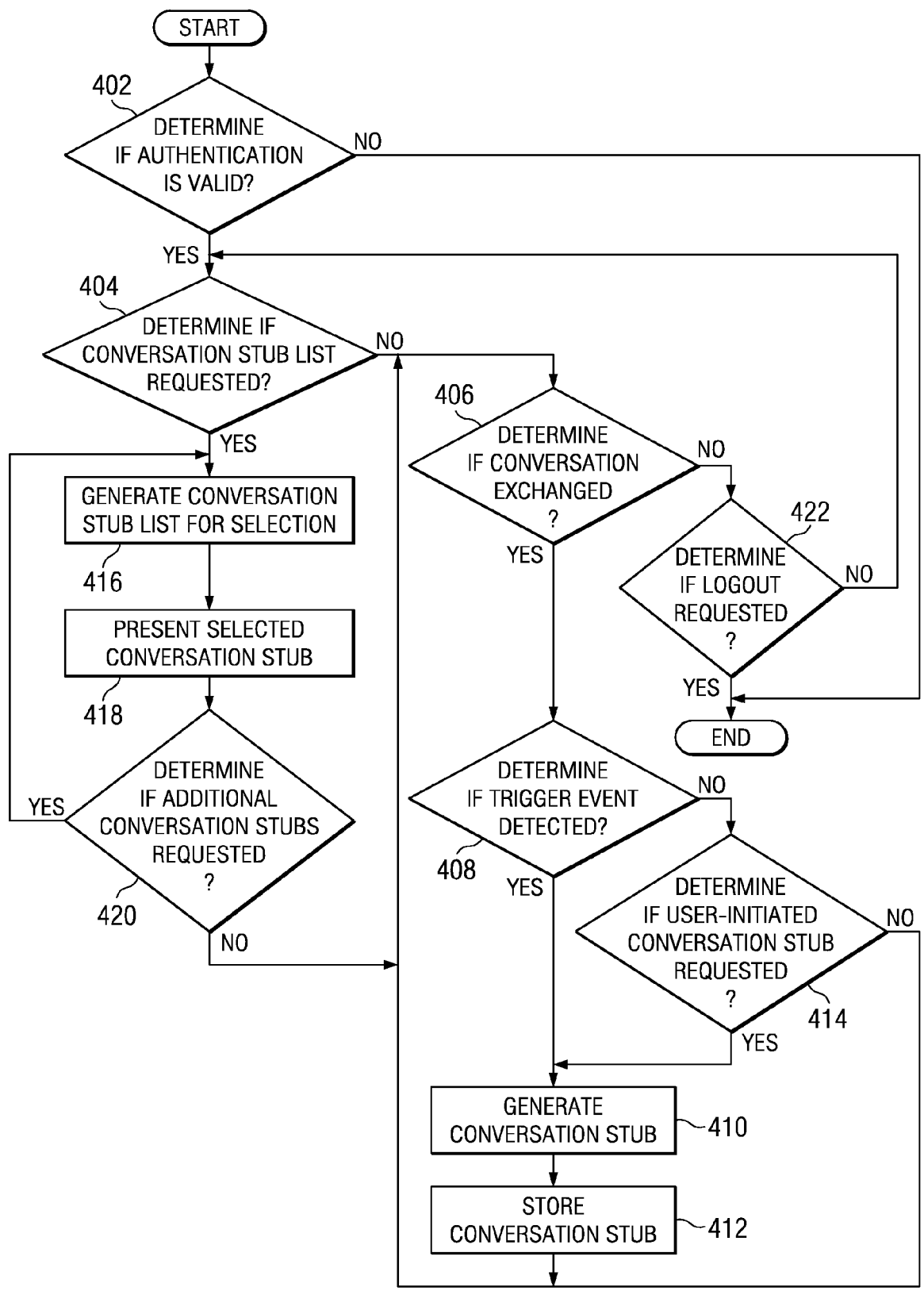
FIG. 4 is a flowchart of a process for managing conversational input in accordance with an illustrative embodiment.

Referring now to FIG. 4, a flowchart of a process for managing conversational input is shown in accordance with the illustrative embodiments. In this example, shown in FIG. 4, the process is performed by a communication device or other hardware device capable of generating and managing conversation stubs, such as communication device 302 in FIG. 3.

The process begins by making a determination as to whether a request for authentication on a communication device is valid (step 402). In response to an invalid authentication, the process terminates thereafter. However, in response to a valid authentication, the process makes the determination as to whether a request has been made to view a list of previously generated conversation stubs (step 404). If no request has been made to view previously generated conversation stubs, then the process makes the determination as to whether the communication device is actively sending and receiving data representing conversational input (step 406).

In the event that the communication device is exchanging conversational input, then the process makes the determination as to whether a triggering event has been detected (step 408). Responsive to detecting a triggering event in the conversational input, the process generates a conversation stub (step 410). The conversation stub is stored in a storage device located remotely to the communication device (step 412), and the process returns to step 406.

Returning to step 408, if the process makes the determination that no triggering event has been detected, the process makes the determination as to whether a user-initiated conversation stub is requested (step 414). In response to a request for a user-initiated conversation stub, the process generates a conversation stub (step 410). The conversation stub is stored (step 412) and the process returns again to step 406. If, however, the process makes the determination that no user-initiated conversation stub has been requested at step 414, then the process returns to step 406.

Returning now to step 404, if the process makes the determination that a request to view a list of previously generated conversation stubs has been made, then the process generates the list of conversation stubs for selection (step 416).

After displaying a selected conversation stub (step 418), the process makes the determination as to whether a selection to view an additional conversation stub has been made (step 420). In response to a selection to view additional conversation stubs, the process returns to step 416. However, in the event that no selection is made to view another conversation stub, the process returns to step 406.

Returning now to step 406, if the process makes the determination that the communication device is not exchanging conversational input, then the process makes the determination as to whether a selection to log off from the communication device has been made (step 422). In the event that a selection to log off of the communication device has been made, the process terminates thereafter. If no selection has been made to log off the communication device, the process returns to step 404.

The illustrative embodiments described herein provide a computer implemented method and computer program product for managing conversational input. The process monitors conversation for a triggering event on a device in a set of communication devices on which a user is authenticated. Responsive to detecting the triggering event, the process generates a conversation stub comprising information relating to the topic of conversation. The conversation stub is stored in a storage device located remotely to the communication device. The conversation stub can then be replicated on any one of the various communication devices from the set of communication devices on which the user is authenticated.

Using this method, the process can facilitate the management of conversational input by allowing the user of a communication device to create and store conversation stubs relating to the various topics of conversation. In addition, the process permits a user to conveniently retrieve the conversation stubs from any number of different communication devices on which the user is authenticated. The conversation stubs allow a user to quickly and effortlessly recall and continue a topic of conversation that may have been inadvertently or purposefully discontinued.

The flowchart and block diagrams in the figures illustrate the architecture, functionality, and operation of some possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing conversational input comprising:
    attempting, using a controller that is included in a first communication device, to authenticate a first user that is using the first communication device to have a conversation with a second user;
    in response to authenticating the first user, monitoring, using the controller, the conversation for a triggering event on the first communication device, wherein the first user must be authenticated before the conversation can be monitored;
    responsive to detecting the triggering event, generating a conversation stub using a stub generator that is included in the first communication device, wherein the conversation stub includes information relating to a topic of conversation;
    storing the conversation stub in a storage device located remotely to the first communication device; and
    responsive to receiving a selection of the conversation stub, presenting the conversation stub on the first communication; wherein the triggering event includes a detection of a voice of the first user and a voice of the second user at a same time, and further wherein the voice of the first user and the voice of the second user overlap, and still further wherein the second user uses a second communication device to communicate with the first user.

2. The computer implemented method of claim 1 wherein the conversation stub further comprises a sequence of key strokes entered on the first communication device.

3. The computer implemented method of claim 1 wherein the triggering event comprises at least one of the following: a change in inflection or tone, the detection of a word or phrase, the detection of background noise, and a user initiated triggering event.

4. The computer implemented method of claim 1 wherein the information relating to the topic of conversation comprises at least one of the following: a default, pre-defined, or user-defined topic, subject matter, keyword, name, descriptor or identifier, date and time, and triggering event.

5. The computer implemented method of claim 1 wherein a fee is charged in response to the accessing of the conversation stub.

6. A computer program product for managing conversational input comprising a non-transitory computer usable medium having computer usable program code tangibly embodied thereon, the computer usable program code comprising:
    computer usable program code for attempting, using a controller that is included in a first communication device, to authenticate a first user that is using the first communication device to have a conversation with a second user;
    in response to authenticating the first user, computer usable program code for monitoring, using the controller, the conversation for a triggering event on the first communication device, wherein the first user must be authenticated before the conversation can be monitored;
    responsive to detecting the triggering event, computer usable program code for generating a conversation stub using a stub generator that is included in the first communication device, wherein the conversation stub includes information relating to a topic of conversation;

computer usable program code for storing the conversation stub in a storage device located remotely to the first communication device; and responsive to receiving a selection of the conversation stub, computer usable program code for presenting the conversation stub on the first communication; wherein the triggering event includes a detection of a voice of the first user and a voice of the second user at a same time, and further wherein the voice of the first user and the voice of the second user overlap, and still further wherein the second user uses a second communication device to communicate with the first user.

7. The computer program product of claim 6 wherein the conversation further comprises a sequence of key strokes entered on the first communication device.

8. The computer program product of claim 6 wherein the triggering event comprises at least one of the following: a change in inflection or tone, the detection of a word or phrase, the detection of background noise, and a user initiated triggering event.

9. The computer program product of claim 6 wherein the information relating to the topic of conversation comprises at least one of the following: a default, pre-defined, or user-defined topic, subject matter, keyword, name, descriptor or identifier, date and time, and triggering event.

10. The computer program product of claim 6 wherein a fee is charged for the accessing of the conversation stubs.

11. The computer implemented method of claim 1 further comprising:
    responsive to receiving a selection of the conversation stub, presenting the conversation stub on a second communication device.

12. The computer implemented method of claim 1, wherein the triggering event is a dropped call.

13. The computer implemented method of claim 1, wherein the triggering event is an interrupted call.

14. The computer implemented method of claim 1, further comprising:
    using voice recognition to attempt to authenticate the first user by comparing a voice of the first user to a stored voice sample.

15. The computer program product of claim 6, further comprising:
    responsive to receiving a selection of the conversation stub, computer usable program code for presenting the conversation stub on a second communication device.

16. The computer program product of claim 6, wherein the triggering event is a dropped call.

17. The computer program product of claim 6, wherein the triggering event is an interrupted call.

18. The computer program product of claim 6, further comprising:
    computer usable program code for using voice recognition to attempt to authenticate the first user by comparing a voice of the first user to a stored voice sample.

* * * * *